E. J. WENDLE.
POWER TRANSMISSION MECHANISM FOR MOTOR VEHICLES.
APPLICATION FILED APR. 15, 1913.

1,129,369.

Patented Feb. 23, 1915.
4 SHEETS—SHEET 1.

Inventor
E. J. Wendle

Witnesses

By
Attorneys.

E. J. WENDLE.
POWER TRANSMISSION MECHANISM FOR MOTOR VEHICLES.
APPLICATION FILED APR. 15, 1913.

1,129,369.

Patented Feb. 23, 1915.

Inventor
E. J. Wendle

UNITED STATES PATENT OFFICE.

EDGAR J. WENDLE, OF JOHNSTOWN, PENNSYLVANIA.

POWER-TRANSMISSION MECHANISM FOR MOTOR-VEHICLES.

1,129,369.  Specification of Letters Patent.  Patented Feb. 23, 1915.

Application filed April 15, 1913. Serial No. 761,335.

*To all whom it may concern:*

Be it known that I, EDGAR J. WENDLE, citizen of the United States, residing at Johnstown, in the county of Cambria and State of Pennsylvania, have invented certain new and useful Improvements in Power-Transmission Mechanism for Motor-Vehicles, of which the following is a specification.

My invention relates to new and useful improvements in power transmission mechanism for self-propelled vehicles, and the main object of my invention is to provide a variable speed, power transmission mechanism which will be less complicated in construction and operation than those now in use and at the same time more efficient and reliable.

More specifically my improved power transmission mechanism is of that type in which the transmission gearing is incorporated in the rear axle and the drive or propeller shaft is housed in a torsion tube, the drive shaft being provided with one or more universal joints to compensate for the change in level between the engine and axle, and another object of my invention is to in effect simplify the construction of both the transmission and differential gearings by mounting the driven gears of the transmission mechanism directly upon a sleeve carrying the small beveled pinions of the differential gearing.

A further object of my invention is to provide a transmission gearing, of the selective speed type, so constructed that all speeds for which the gearing is adapted may be obtained by the proper manipulation of a single lever.

A still further object of my invention is to provide a lock for the transmission gearing operable in conjunction with the clutch and so arranged that the gears are always locked in selective position when the clutch is in active position, this of course preventing all changing of the transmission gears while the driving shaft is being driven by the engine.

In carrying out the above objects, I employ a set of gears which is mounted on one of the live axle sections and which is movable along the same and a second set of gears mounted directly upon the adjacent end of the driving shaft and movable toward and away from the first set by longitudinal movement of the driving shaft.

A further object of my invention therefore is to provide means which may be operated by a single lever for independently and selectively reciprocating both sets of gears to permit the bringing of any one gear of one set into mesh with any selected gear of the other set.

While the above are the chief objects which I have in view, many minor objects, such as the provision of a transmission construction in which the thrust is taken up by the bearings of the casing and not by the gears, of a transmission mechanism in which the larger gears engage the smaller gears to provide a positive and silent engagement, in which all speeds obtainable are through a direct drive instead of through the medium of idler gears and in which the gears are thrown into mesh by the forward movement of a single lever, will appear during the more detailed description of my invention.

With these various objects in view, my invention will be more fully described, illustrated in the accompanying drawings, and then specifically pointed out in the claims which are attached to and form a part of this application.

In the drawings: Fig. 5 is a detailed sectional view along the line 5—5 of Fig. 2.

Corresponding and like parts are referred to in the following description and indicated in all the views of the drawings by the same reference characters.

Figure 1:
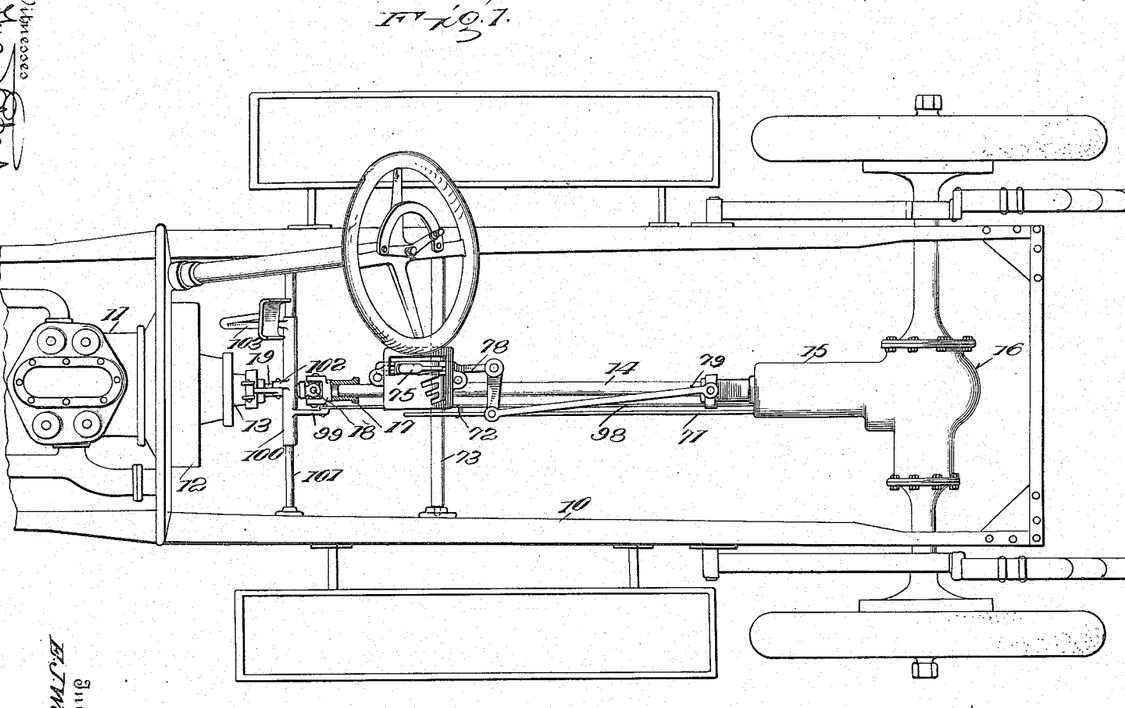
Figure 1 is a top plan view of a chassis, showing my improved power transmission in place.

In Fig. 1 I have illustrated my improved power transmission in connection with the chassis or frame 10 of a conventional form of motor car having an engine 11 of any suitable type, the shaft of which carries a fly wheel 12 and is operatively connected through the medium of a clutch 13 with one end of a driving shaft indicated as a whole by the numeral 14, the opposite end of which extends through a torsion housing 15 forming a part of the rear axle casing 16. The driving shaft 14 is squared at its forward end for sliding engagement in the squared socket or sleeve 17 of a universal joint 18 carried by the end of a shaft 19 extending from the clutch. The opposite end of the driving shaft 14 carries the gears of one of the sets of gears of the transmission gearing which will be more fully described in a later portion of the specification. It will therefore be apparent that the driving shaft, because of its squared terminal engaging in the squared socket or sleeve of the clutch shaft will, when the clutch is in active position, be positively rotated while at the same time, under all conditions, it is free to be reciprocated without becoming disconnected from the clutch shaft. Because of this, the gears formed upon the rear end of the driving shaft may, through a mechanism to be later described, be selectively brought into engagement with the gears of the other set of gears of the differential gearing.

Figures 2, 3:
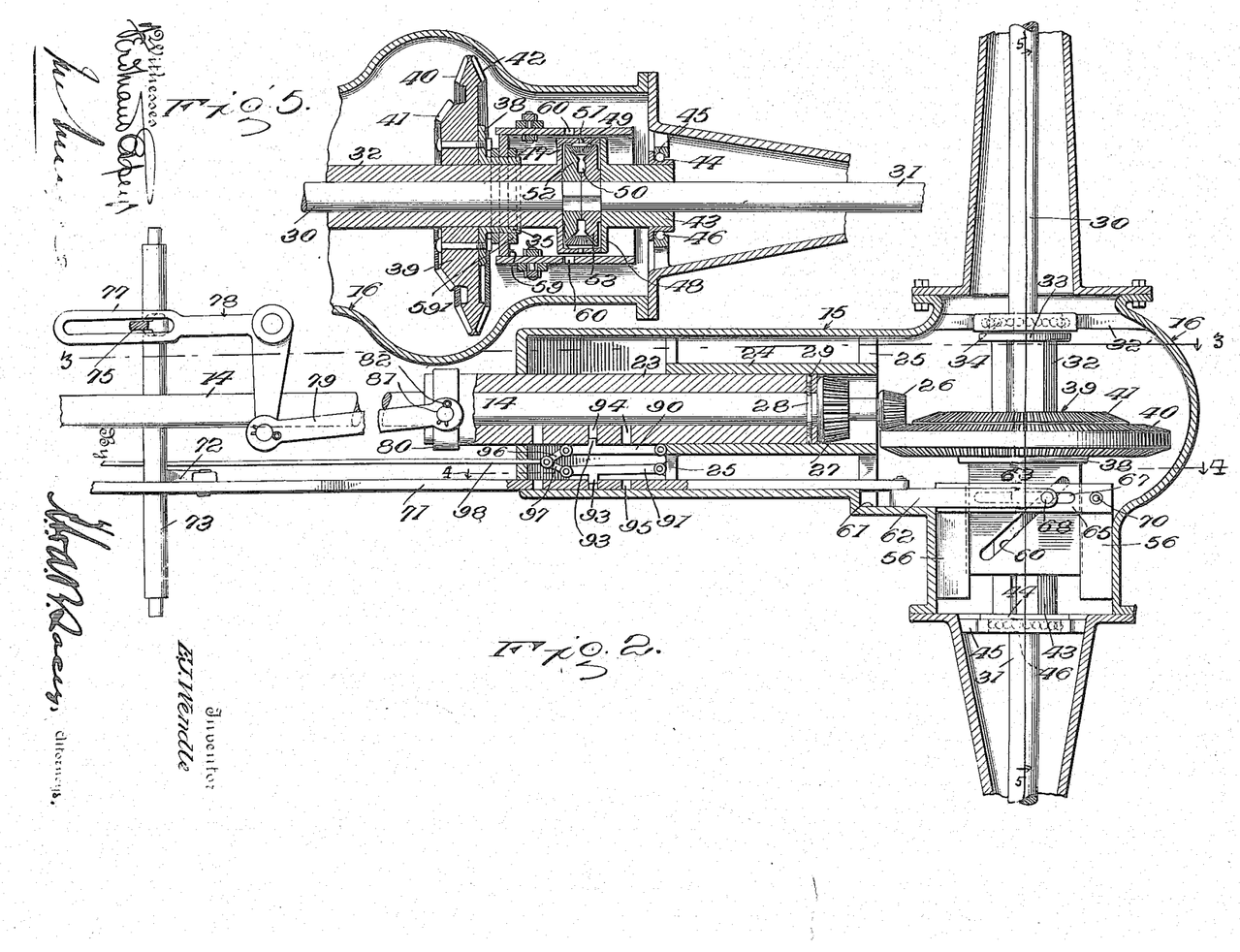
Fig. 2 is a fragmentary plan view of the transmission and differential gears and a portion of the operating mechanism therefor, the gear casings and certain other portions of the structure being shown in section to more clearly illustrate the details.
Fig. 3 is a longitudinal sectional view on the line 3—3 of Fig. 2, looking toward the gears.
Figure 3:
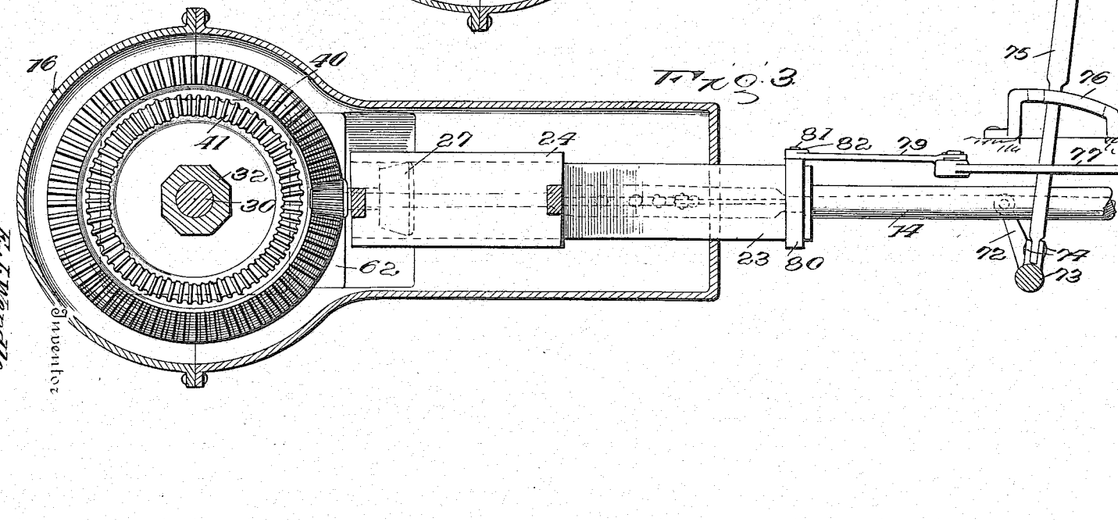
Figure 4:
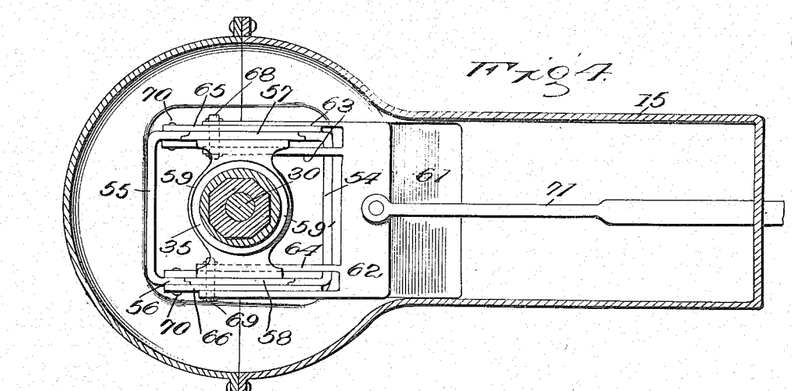
Fig. 4 is a section on the line 4—4 of Fig. 2, looking toward the differential gearing and showing the manner in which the set of transmission gears carried by the rear axle is supported for movement along the axle.

Referring more specifically to Fig. 2 of the drawings, it will be noted that the rear portion of the shaft 14 is journaled in a sleeve 23 one end of which extends within the torsion housing 15 and is mounted for reciprocatory movement in a bearing sleeve 24 supported by spiders 25 formed integrally with the housing or in any other preferred manner. This shaft 14 is provided at its rear end with a beveled gear 26 preferably cut upon the shaft itself and in spaced relation to this gear with a second larger beveled gear 27, this latter gear being formed upon the shaft in the same manner as the first and immediately beyond the rear end of the sleeve 23. The sleeve 23 is somewhat larger in diameter than the diameter of this larger gear and the latter may therefore be retracted into the bearing sleeve 24, as shown in Fig. 2. The shaft 14 is provided adjacent this gear 27 with a circumferentially formed groove 28 and threaded studs 29 are passed through the sleeve 23 to seat by their inner ends in this groove to prevent independent longitudinal movement of the shaft with respect to the sleeve, while at the same time leaving the shaft free to revolve in the sleeve. The outer ends of these studs are disposed slightly below or flush with the surface of the sleeve 23 and therefore offer no obstruction to its movement in the bearing sleeve 24. The two gears above described constitute one of the two sets of gears of my improved transmission gearing. The rear axle casing 16 incloses the live sections 30 and 31 of the rear axle, the former of said sections being slightly longer than the latter to position the differential gearing, which will be later described, at one side of the transmission gearing which must, of necessity, be in alinement with the driving shaft 14. The axle section 30 is rotatable in a sleeve 32 having angularly formed longitudinal faces, the sleeve being preferably octagonal in section and a spider 32' coacts with a bearing collar 33 carried by the outer end of this sleeve to provide a race for ball bearings 34 to permit said sleeve to rotate with as little friction as possible. A sleeve or collar 35 is mounted for longitudinal movement over the sleeve 32 and is provided at one end with a radial flange 38 to which is bolted or otherwise secured a multiple gear 39. This multiple gear is double-faced and cutting that face remote from the collar are series of teeth forming concentric beveled gears 40 and 41, while cutting the opposite face is a series of teeth forming a beveled gear 42, these gears forming the other set of gears hereinbefore mentioned. The various changes in speed, forward and reverse permitted by this transmission gearing, are obtainable by the selective meshing of either of the gears 26 and 27 with the gears of the multiple gear 39.

At this point it will be noted that although the gears 26 and 27 and also the gears 40, 41 and 42 have all been described as beveled gears, they are not in fact true beveled gears in that they are cut in such a manner as to allow sufficient play to permit the meshing of either of the gears 26 and 27 with any one of the gears of the multiple gear which would not be possible if all the gears were true beveled gears. It will of course be apparent that the multiple gear 39 may be replaced, if desired, by three separate and independent gears but as such a construction would be more complicated and bulky and would therefore necessitate a wider range of movement of the gears to bring them into mesh with the gears of the driving shaft. I prefer to use the multiple gear shown. The inner end of the axle section 31 is also rotatably mounted in an octagonal sleeve 43 which carries a collar 44 co-acting with a spider 45 to provide a ball race for bearings 46 to freely mount the shaft section 31 and its sleeve 43. The inner end of the sleeve 32 terminates in a cylindrical housing 47, while the inner end of the sleeve 43 terminates in a radial flange 48 forming a closure for the housing 47, the peripheral wall of the housing 47 forming a support for the small beveled pinions 49 of the differential gearing 50. These pinions 49 are mounted for rotation upon stub shafts 51 extending radially inward from the housing 47 and mesh with beveled gears 52 and 53 mounted against rotation upon the adjacent, squared ends of the live axle sections 30 and 31, respectively. The flange 48 is preferably secured to the housing 47 in any suitable manner so that the sleeves 32 and 43 will rotate in unison. It will therefore be apparent that any rotary movement imparted to the multiple gear 39 will be transmitted through the sleeves 32 and 43 to the differential gearing and by means of the differential gearing to the live axle sections. As this differential gearing is of conventional type, with the exception of the sleeves, all further description of the same is unnecessary.

The multiple gear 39, together with the adjacent portion of its sleeve is not only free for rotation about the axle section 30, but also for reciprocatory movement on the sleeve 32, as previously stated. In order to provide means by which this multiple gear may be reciprocated upon the axle section, brackets 54 and 55 are secured to the forward and rear inner faces of the casing 16 and formed at their upper and lower ends with inwardly directed extensions 56, the edges of which are rabbeted to receive the rabbeted edges of upper and lower shifter plates 57 and 58, respectively. The ends of these shifter plates adjacent the multiple gear are connected by a spider 59 extending between collars 59′ of the sleeve which is left free to rotate. The shifter plates are provided with vertically alined diagonal slots 60 which extend from the outer forward portions of the plates to the inner rear portions as clearly shown in Fig. 2 of the drawings.

The inner face of the casing section 15 is provided with a guide seat 61 in the form of a depression to receive the body portion of a yoke 62 having spaced pairs of arms 63 and 64, the former of which extend one above and one below the shifter plate 57, while the latter extend one above and one below the shifter plate 58. Plates 65 and 66 are positioned one between the shifter plate 57 and the upper arm 63 and the other between the shifter plate 58 and the lower arm 64, these plates being provided with alined longitudinal slots 67. A bolt, pin or other suitable fastening device 68 is passed through the free ends of the arms 63, the slot 67 of the plate 65 and the slot 60 of the plate 57, while a similar fastening device 69 is similarly passed through the arms 64 and slots of the plates 58 and 66. These plates 65 and 66 are firmly secured at their front and rear ends to the bracket extensions 56 by rivets or other suitable fastening devices 70 in such a manner that their slots 68 extend at right angles to the rear axle and it will therefore be apparent that these plates act as guide plates to constantly maintain the yoke 62 and its arms at right angles to the rear axle. It will therefore be apparent that if the yoke 62 is moved forwardly or rearwardly the shifter plates will be forced inwardly or outwardly respectively to move the multiple gear along the sleeve 32.

An operating rod 71 is pivotally secured by one end to the central portion of the yoke body and its opposite end is extended forwardly through the forward end of the casing section 15 and pivotally connected to the free end of the crank arm 72 of a transversely extending crank shaft 73, the ends of which are journaled in the opposite side portions of the frame 10. This crank shaft is provided centrally with upwardly directed, longitudinally extending ears 74 between which is pivoted the lower end of the single control lever 75 employed with my transmission mechanism. It will be apparent that this lever 75 may be swung transversely of the car without in any way moving the shaft 73 because of the manner in which it is pivotally mounted between the ears 74, while for the same reason any longitudinal swinging of the lever 75 will cause a partial turning of the crank shaft to reciprocate the operating rod 71 and so reciprocate the multiple gear upon the sleeve 32. The control lever 75 extends through a slotted lever plate 76 which is supported in any suitable manner immediately in advance of the front seat of the vehicle and centrally of the same as shown in Fig. 1. This control lever 75 also passes through the slot of the slotted arm 77 of a bell crank lever 78 which is pivotally mounted for swinging movement in a horizontal plane, upon a bracket or other suitable support carried by the car frame and not shown, and the opposite end of which is operatively connected by a rod 79 to the sleeve 23, its connection with the sleeve including a collar 80 secured to the forward end of the sleeve and having an upwardly directed cylindrical stud 81 which passes through an eye formed in the free end of the rod 79, the rod being held against disengagement from the stud by a split pin 82. It will of course be apparent that any transverse swinging of the control lever 75 will act through the bell crank lever 78 to reciprocate the shaft 14 together with its gears 26 and 27. It will therefore be seen that by proper swinging of the control lever 75 either set of gears may be moved independently of the other and it will therefore be clear that both sets may be moved successively to bring any desired gear of one set into mesh with any desired gear of the other.

In order to insure and direct the proper movement of the control lever to obtain the desired results, I provide the lever plate 76 previously mentioned. This plate is provided along its rear edge with a transversely extending slot 83 having a plurality of spaced apart branch slots 84, 85, 86, 87 and 88 all of which extend radially with respect to the pivot point of the bell crank lever 78. The branches 84 and 85 of the slot lead from opposite ends of the same, the branch 84 extending at substantially right angles to the main body of the slot and terminating in an offset extension 89 opposite and parallel to the adjacent end of the main slot 83.

Figure 6:
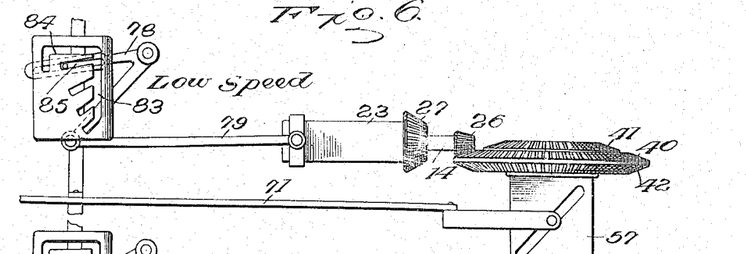
Figs. 6 to 10 inclusive are diagrammatic views illustrating the position of the transmission gears and the operating mechanism therefor for each of the various speeds obtainable by the power transmission construction illustrated in these drawings.
Figure 7:
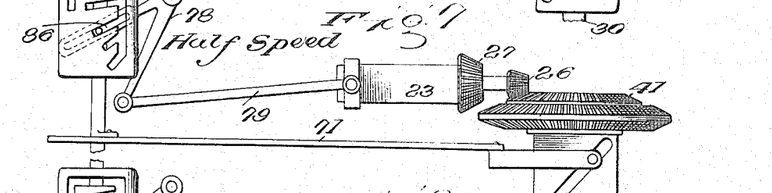
Figures 8, 9, 10:
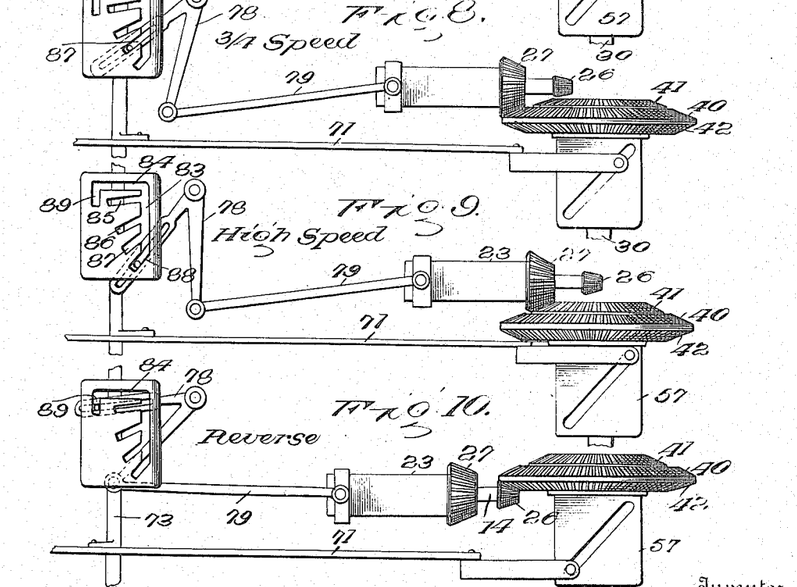

In order to insure a clear understanding of the proper manipulation of the control lever 75 to obtain the desired selection of speed gears I have clearly illustrated the positions of the vital parts of the mechanism for each of the speeds obtainable in Figs. 6 to 10 inclusive. Before entering into a detailed explanation of these figures it will be noted that any swinging of the lever through the slot 83 or the terminal 89 of the branch slot 84 will act through the bell crank lever 78 to reciprocate the set of gears carried by the driving shaft, while any reciprocation of the lever in the branch slots 85, 86, 87 and 88 and in the body portion of the branch slot 84 will act through rotation of the crank shaft to move the multiple gear 39 transversely along the sleeve 32. It will further be noted that inasmuch as all the branches of the main slot 83 extend radially with respect to the pivotal point of the bell crank lever 78, any movement of the control lever 75 in these branches will have absolutely no effect upon the lever 78 and will therefore leave the driving shaft and its gears stationary. It will be noted that a gear of one set is in mesh with the other set only when the control lever is seated in the extreme forward end of one of the branches of the main slot 83 and that for this reason when the lever is seated in the main slot itself, irrespective of what portion of the slot it occupies, the gears are in neutral or inoperative position. Assuming at the start that the gears are in neutral position if the control lever 75 is swung into alinement with the branch 85 of the slot, the set of gears carried by the driving shaft will be moved to such a position that the smaller gear 26 thereof will be in position to be engaged by the beveled gear 40 of the multiple gear when the latter is moved a sufficient distance along the sleeve 32. If then the lever is swung forwardly to seat in the advance end of the branch 85 of the slot as shown in Fig. 6, this swinging of the lever will act through the operating rod 71 to move the multiple gear to the position shown in Fig. 6 in which the gear 26 meshes with the gear 40, this being the low speed drive. After sufficient headway has been obtained the lever may be swung back into the slot 83, that is to neutral position, and then swung into alinement with the branch 86 which will move the driving shaft rearwardly to bring its smaller gear 26 into position to be engaged by the smaller gear 41 of the multiple gear upon the forward swinging of the lever into the branch 86 of the slot, this operation changing the gear from low to half speed. In like manner the lever may be first swung to neutral and then into the branch 87 of the slot as shown in Fig. 8 to bring the larger gear 27 of the driving shaft into engagement with the larger gear 40 of the multiple gear giving three-fourths of speed drive or the lever may be swung into the branch 88 of the slot as shown in Fig. 9 to give high speed, the gear 27 in the latter case meshing with the gear 41. To reverse the drive at any time, the lever is first swung into neutral, that is, into the slot 83 and is then moved into alinement with the branch 84 of the slot, the latter part of this movement shifting the gear 26 ahead to permit the multiple gear to pass completely by the same upon the forward movement of the lever to the forward end of the branch 84. The lever is then swung into the offset terminal portion of the branch 84 to the position shown in Fig. 10 which moves the driving shaft rearwardly to bring the gear 26 into mesh with the gear 42.

From the foregoing description, it will be seen that a proper manipulation of the control lever 75 will throw the transmission gears into any desired speed forward or reverse for which the gearing is adapted.

In order to relieve the actuating levers and rods of all strain under normal conditions and also to absolutely avoid all danger of the gears moving out of mesh through vibration of the vehicle, I have provided a lock by means of which both sets of gears may be simultaneously locked against reciprocatory movement. This lock mechanism includes a pair of latch arms 90 and 91 pivoted by their rear ends to the forward spider 25 and provided intermediate their length with laterally directed latch pins 93, the latch pin of the latch arm 90 being adapted for passage into any one of a plurality of perforations 94 formed in the sleeve 23, while the latch pin of the latch arm 91 is similarly adapted to enter one of the perforations 95 of the operating rod 71. It will of course be apparent that when these latch pins are in place all reciprocatory movement of the sleeve 23 and rod 71 is prevented and as long as these parts are held against reciprocatory movement both sets of gears, being controlled by these parts, are held against reciprocatory movement. Links 96 and 97 are pivotally connected to the free ends of the latch arms 90 and 91, respectively, and the free ends of these links are connected by a common pivot with the rear end of a connecting rod 98. The forward end of this rod is pivotally connected to a crank arm 99 carried by a sleeve 100 which is revolubly mounted upon a transversely extending shaft 101. This sleeve carries a second crank arm 102 which is operatively connected with the clutch 13 and the sleeve further carries a clutch operating pedal 103.

From the foregoing description, it will be apparent that forward pressure upon the clutch pedal to release the clutch will act through the sleeve 100 and arm 99 to draw upon the connecting rod 98 and so swing the forward ends of the latch arms toward each other to move the latch pins out of the perforations of the sleeve 23 and operating rod 71 and unlock the gears. On the other hand, as soon as the pressure is removed from the clutch pedal, the springs or other clutch devices will counter-rotate the sleeve forcing the connecting rod 98 rearwardly to spread the forward ends of the latch arms and force the latch pins through the perforations of the sleeve and operating rod. The perforations 94 and 95 are so formed that one perforation of the sleeve 23 and operating rod 71 will always be in alinement with the latch pins for each selective setting of the gears and it will therefore be clear that when the clutch is in operative position the gears will always be locked and when the clutch is released the gears will always be unlocked. Because of this, all accidental disengagement of the gears is prevented and moreover it is impossible for an ignorant operator to change from one speed to another while the clutch is thrown in. As this is one of the chief causes for gear stripping the advantage of this lock will be readily understood.

The foregoing description, taken in connection with the drawings, particularly Figs. 6 to 10 inclusive, will give a clear and complete understanding of the operation of my power transmission and any further application of the same is therefore unnecessary. There are however, a few points which should be noted as materially affecting the efficiency of the transmission mechanism. Among these points is the fact that the driving shaft and axle sections, together with their operating mechanisms are so constructed and mounted that the thrust is taken up by the bearings of the casing and shifting plates and not by the gearing. All speeds obtainable are by a direct drive instead of through the medium of idle gears and with the exception of the reverse drive, all the different drives are obtained by moving a larger gear into engagement with a smaller gear instead of moving a smaller gear into engagement with a larger gear as is common. This is of importance as it results in a positive and silent engagement of the gears.

The entire mechanism is much less complicated than that of power transmission mechanisms now generally in use, due to the fact that the differential gearing is in effect a unit with the rear axle drive and that all the speeds are controlled by the shifting of one control lever, the last movement of which, with the exception of the reverse speed, is in a forward direction. If desired, the multiple gear 39 may be mounted upon one section of a two-part shaft instead of upon one section of the rear axle and the vehicle driven by chains trained over sprocket wheels at the ends of the shaft sections and over other sprocket wheels carried by the rear axle, this construction not being illustrated as it is common to drive vehicles by a chain driven from a transverse two-part drive shaft to the rear axle. In other words, it will be understood that various changes in details of construction may be made and that the transmission mechanism may be somewhat modified to adapt it for use upon vehicles of different types, providing these changes are within the scope of the appended claims, without in the slightest degree departing from the spirit of my invention, and that I do not wish in any way to limit myself to the specific details of construction illustrated in the drawings and described in this specification, these drawings being merely a disclosure of a preferred form of my invention.

Having thus described the invention, what is claimed as new is:

1. In a transmission driving mechanism for motor vehicles, sets of gears, the gears of each set being relatively fixed, and means including a single lever operable to move one set of gears to free it from the other, to move the other set of gears to selected position, and to move the first set of gears to bring one of its gears into mesh with the selected gear of the other set.

2. In a transmission driving mechanism for motor vehicles, sets of gears, the gears of each set being relatively fixed, means for moving one set of gears to free it from the other, for moving the other set of gears to selected position, and for moving the first set of gears to bring one of its gears into mesh with the selected gear of the other set, the line of movement of one set of gears being at right angles to the line of movement of the other set, said means being operable by movement of a single lever.

3. In a transmission driving mechanism for motor vehicles, sets of gears, the gears of each set being relatively fixed, each set of gears being movable at right angles to the line of movement of the other set of gears, and means including a single lever for successively moving one set of gears to its extreme position in one direction, moving the other set of gears to a predetermined position and moving the first set of gears to bring the selective gears of each set into mesh.

4. In a transmission driving mechanism for motor vehicles, sets of gears, the gears of each set being relatively fixed, a lever, and connecting means between the lever and each set of gears, the connecting means between the lever and one set of gears being such that the gears are moved when the lever is swung in one direction and remains stationary when the lever is swung at right angles to said direction while the connecting means between the lever and the other set of gears is such that the swinging of the lever in the last named direction will move the other set of gears, while a swinging of the lever in the first named direction will leave the other gears stationary.

5. In a transmission driving mechanism for motor vehicles, a lever, sets of gears, the gears of each set being relatively fixed, means for shifting said sets of gears to selectively bring any gear of one set into mesh with any gear of the other set, and means for locking the sets against movement with respect to each other when said gears are in mesh, the shifting and locking means being both operated by the said lever.

6. In a transmission driving mechanism for motor vehicles, sets of gears, the gears of each set being relatively fixed, means for shifting said sets of gears to selectively bring any gear of one set into mesh with any gear of the other set, means including a clutch for transmitting power to one of the sets of gears, and means operable by the locking of the clutch for locking both sets of gears in adjusted position.

7. In a power transmission mechanism, a set of gears movable transversely as a unit, a driving gear movable longitudinally, means for moving the set of gears and the driving gear to selectively bring the driving gear into mesh with any one of the set of gears, and means for simultaneously locking the set of gears against transverse movement and the driving gear against longitudinal movement when the latter is in mesh with one of the former.

8. In a transmission driving mechanism for motor vehicles, a driven axle, driven gears rotatable on the axle, means operable by the rotation of said gears for rotating the axle, a driving shaft formed of telescopic sections, a set of gears mounted on one of said sections, and means for moving said section with respect to the other section for moving its gears in and out of mesh with the driven gears of the axle.

9. In a transmission driving mechanism for motor vehicles, a driven axle, driven gears rotatable on the axle, means operable by the rotation of said gears for rotating the axle, a driving shaft formed of telescopic sections, a set of gears mounted on one of said sections, means for moving said section with respect to the other section for moving its gears in and out of mesh with the driven gears of the axle, and means for reciprocating the driven gears on the axle to bring them into and out of alinement with the gears of the driving shaft.

10. In a transmission driving mechanism for motor vehicles, an axle section, a set of gears mounted for reciprocatory and rotary movement upon said axle section, a telescopic driving shaft, a set of gears mounted upon one of the telescoping sections of the driving shaft, and lever actuated means for reciprocating said section of the driving shaft.

11. In a transmission driving mechanism for motor vehicles, an axle section, a set of gears mounted for reciprocatory and rotary movement upon said axle section, a telescopic driving shaft, a set of gears mounted upon one of the telescoping sections of the driving shaft, and lever actuated means for reciprocating said section of the driving shaft, said means including a lever plate provided with guide slots, a lever passed through the plate and pivoted by one end to permit swinging within the limits of the slot, a bell crank lever having a slotted arm through which the first lever passes, a sleeve mounted upon the telescopic shaft section, and a link pivotally connecting the free arm of the bell crank lever with the sleeve, the sleeve and shaft section being secured against independent reciprocatory movement.

12. In a transmission driving mechanism for motor vehicles, a reciprocally mounted driving shaft, a set of gears carried by said shaft, a live axle section, a set of gears carried by said axle section adapted for selective engagement with the gears of the driving shaft, a sleeve carried by the set of gears on the axle section, a spider in which said sleeve rotates, diagonally slotted shifter plates carried by the spider, longitudinally slotted guide plates, a shifter yoke having pins passed through the slots of adjacent guide and shifter plates, and means for reciprocating said yoke.
13. In a transmission driving mechanism for motor vehicles, a reciprocally mounted driving shaft, a set of gears carried by said shaft, a live axle section, a set of gears carried by said axle section adapted for selective engagement with the gears of the driving shaft, a sleeve carried by the set of gears on the axle section, a spider in which said sleeve rotates, diagonally slotted shifter plates carried by the spider, longitudinally slotted guide plates, a shifter yoke having pins passed through the slots of adjacent guide and shifter plates, and means for reciprocating said yoke, said means including a rock shaft, a lever for rocking the shaft, an arm extending from the shaft and a rod pivotally connecting said arm and yoke.

14. In a transmission driving mechanism for motor vehicles, sets of gears, means for shifting said sets of gears to selectively bring any gear of one set into mesh with any gear of the other set, said means including parallel spaced apart reciprocatory members, and means for locking the gears in selective position, said means including pivoted latch arms having pins adapted for engagement in perforations formed in the reciprocatory members, and operative connection between the latch arms and a clutch.

15. In a transmission driving mechanism for motor vehicles, sets of gears, each set of gears being movable at right angles to the other set of gears, a lever adapted for transverse or longitudinal swinging movement, connecting means between the lever and each set of gears whereby the transverse swinging of the lever will cause a longitudinal movement of one set of gears and a longitudinal swinging of the lever a transverse movement of the other set of gears, and a slotted lever plate through which the lever passes to limit and control the swinging of the lever.

16. In a transmission driving mechanism for motor vehicles, sets of gears, each set of gears being movable at right angles to the other set of gears, a lever adapted for transverse or longitudinal swinging movement, connecting means between the lever and each set of gears whereby the transverse swinging of the lever will cause a longitudinal movement of one set of gears and a longitudinal swinging of the lever a transverse movement of the other set of gears, and a slotted lever plate through which the lever passes to limit and control the swinging of the lever, said plate being provided along adjacent sides with an L-shaped slot, one arm of which is provided with a plurality of branch slots and the other arm of which is provided with a lateral extension.

17. In a transmission driving mechanism for motor vehicles, a set of gears mounted for longitudinal reciprocatory movement, a set of gears mounted for transverse reciprocatory movement, a rock shaft, a control lever pivoted by one end to the rock shaft and free to swing transversely independent of the rock shaft and to swing longitudinally to rotate the rock shaft, connecting means between the lever and the first set of gears for reciprocating said gears, and connecting means between the rock shaft and the second set of gears for reciprocating the latter.

18. In a transmission driving mechanism for motor vehicles, a set of gears mounted for longitudinal reciprocatory movement, a set of gears mounted for transverse reciprocatory movement, a rock shaft, a control lever pivoted by one end to the rock shaft and free to swing transversely independent of the rock shaft and to swing longitudinally to rotate the rock shaft, connecting means between the lever and the first set of gears for reciprocating said gears, connecting means between the rock shaft and the second set of gears for reciprocating the latter, and means for controlling the swinging movement of said lever.

19. In a transmission driving mechanism for motor vehicles, sets of gears mounted for reciprocatory movement at right angles to each other whereby one set of gears may be brought into engagement with the other set, means for reciprocating one of the sets of gears, a rock shaft having a radially extending arm, a reciprocating yoke, a rod connecting the arm of the rock shaft and the yoke, and connecting means between the yoke and other set of gears whereby a longitudinal movement of the yoke causes a transverse movement of the set of gears.

20. In a transmission driving mechanism for motor vehicles, a set of gears movable transversely, a set of co-acting gears movable longitudinally, a lever mounted for both transverse and longitudinal swinging movement, connecting means between the lever and first set of gears whereby longitudinal movement of the lever reciprocates said gears, and connecting means between the second set of gears and the lever whereby transverse movement of the lever reciprocates said second set of gears.

In testimony whereof I affix my signature in presence of two witnesses.

EDGAR J. WENDLE. [L. S.]

Witnesses:
L. Roy E. Feltere,
Harry W. Griffith.